Nov. 29, 1938.     W. GEYGER     2,138,344
SYSTEM FOR MEASURING ALTERNATING CURRENT QUANTITIES
Filed Sept. 1, 1936     4 Sheets-Sheet 2
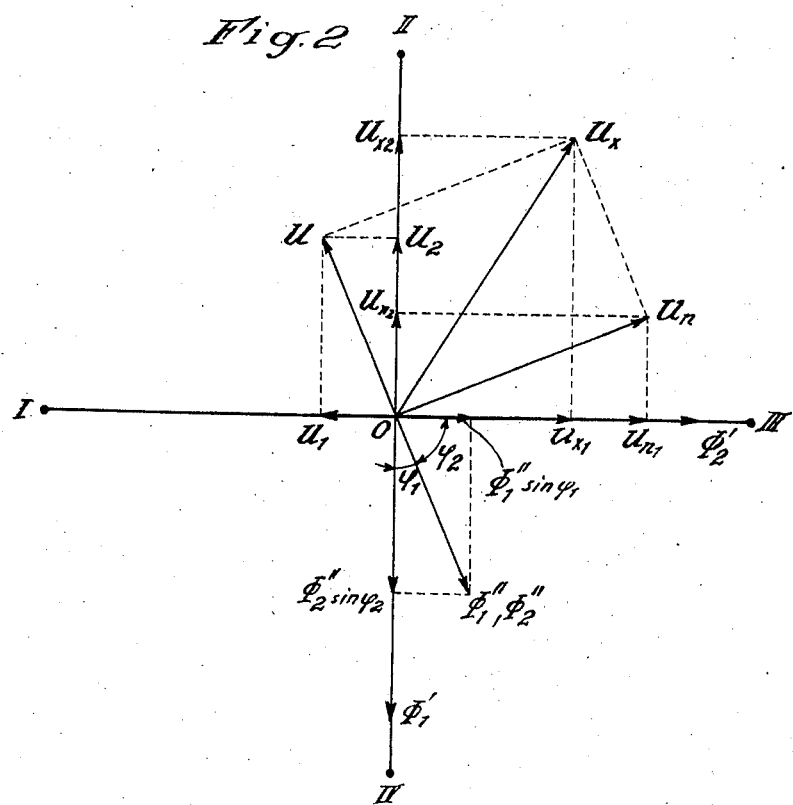

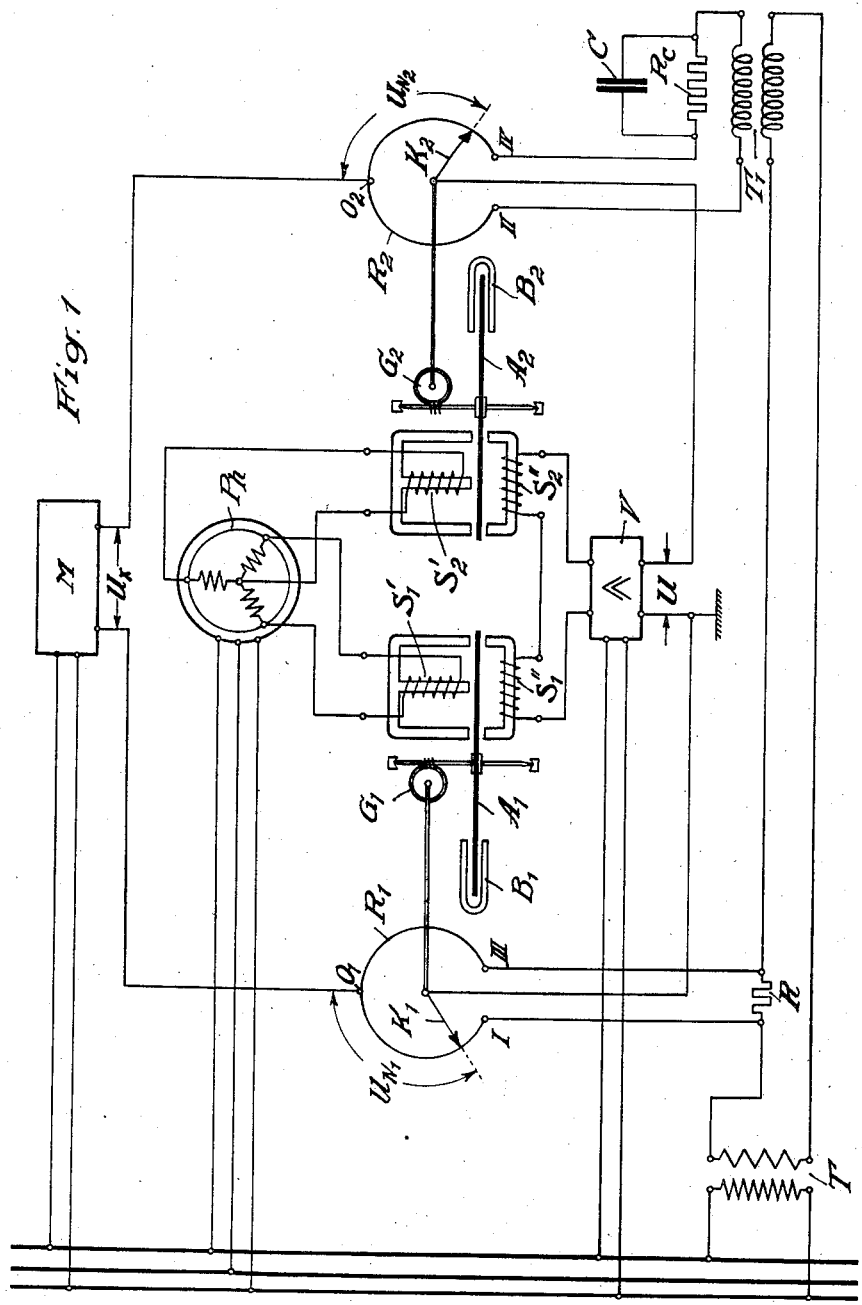

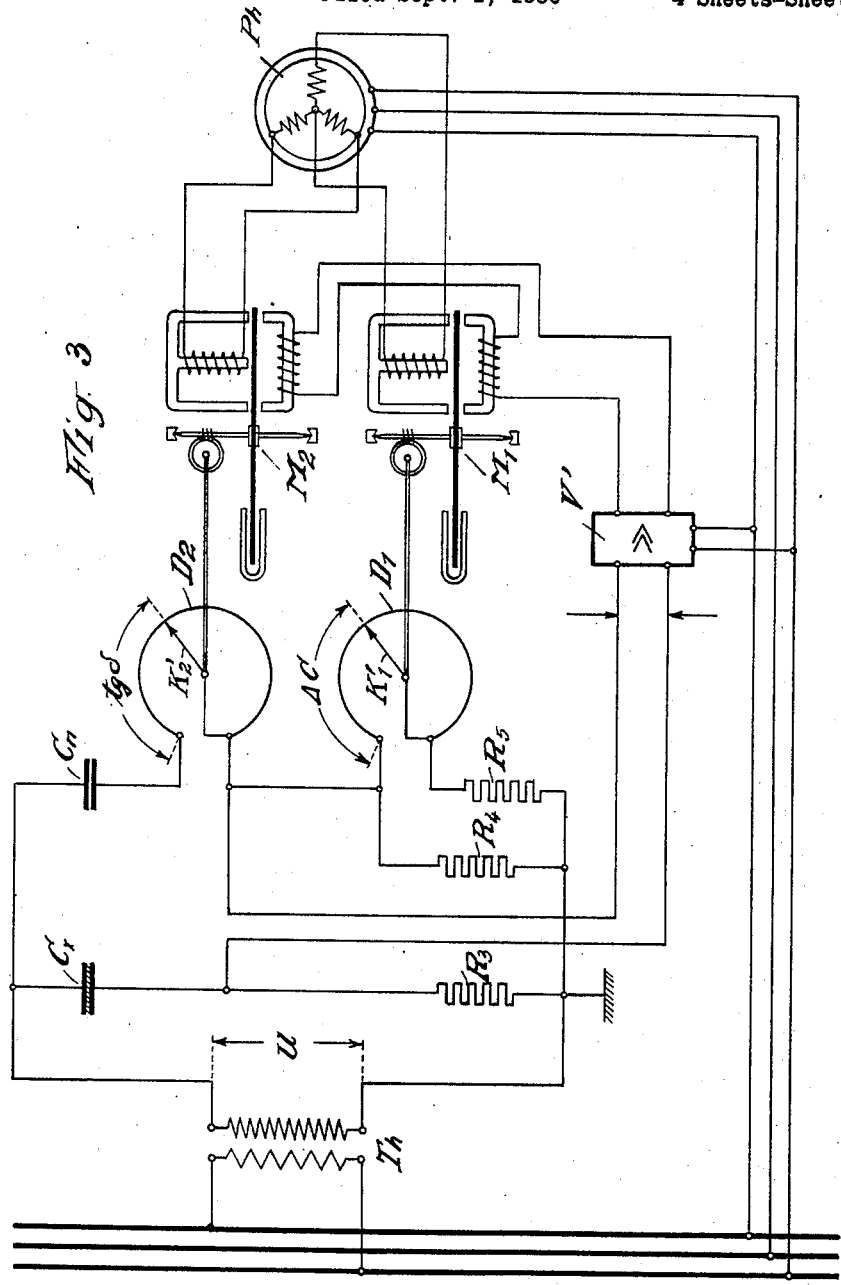

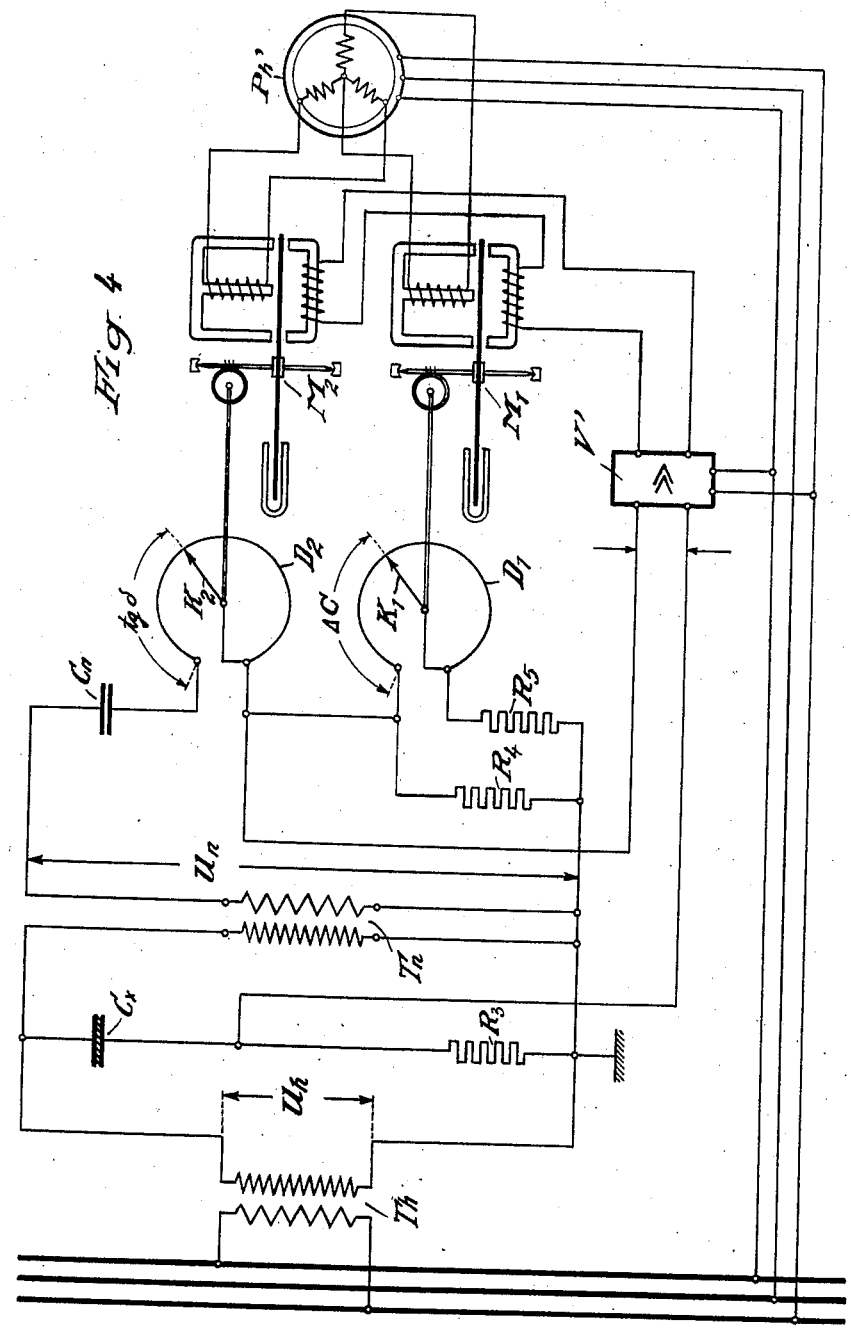

Patented Nov. 29, 1938

2,138,344

UNITED STATES PATENT OFFICE 2,138,344

SYSTEM FOR MEASURING ALTERNATING CURRENT QUANTITIES

Wilhelm. Geyger, Berlin-Schmargendorf, Germany, assignor to Siemens & Halske, Aktiengesellschaft, Siemensstadt, near Berlin, Germany, a corporation of Germany Application September 1, 1936, Serial No. 98,886
In Germany October 3, 1935

8 Claims. (Cl. 175—183)

My invention relates to systems for measuring alternating-current values by means of balancing these values with the aid of a compensation or bridge connection, and more particularly to a system for compensating complex alternating-current values. In such systems there are two balancing directions (corresponding to the real and imaginary component) to which correspond also two balancing means allotted to these directions. These balancing means have hitherto been always adjusted by hand. This kind of measurement is, however, comparatively complicated, since the balancing by hand not only requires time but also a certain dexterity. Consequently, the use of systems of the above-indicated character has hitherto been limited substantially to laboratories, since the elements hitherto employed in complex compensation connections would entail a very complicated and sensitive automatic connection.

It has been proposed to simplify the manipulation of these systems and to render them utilizable for measurements during or within technical operations by designing the individual bridge elements in such a manner that a directly indicating deflection measuring instrument may be employed in the diagonal branch of the bridge. This method of measurement has been objected to because the essential advantage of the bridge connection, i. e. the complete balance, is dispensed with. However, a disadvantage need not be seen therein. It is, however, necessary in any event to arrange for the last-mentioned method a relatively sensitive deflection measuring instrument in the measuring diagonal. Therefore the instrument used for this method must be very carefully attended to when in operation. Furthermore, only a single value can be directly measured with the aid of the deflection method. If in addition thereto also other values are to be determined, particular measures are necessary which render the attendance of the measuring device undesirably complicated.

Another system proposed for the provision of a complex alternating-current compensator with direct deflection of the pointer contains two induction dynamometers the moving coil of which is so adjusted that the alternating potential to be measured is compensated for. However, this method may only be employed in particular cases and cannot, for instance, be used in measurements in connection with the usual compensation or bridge connections, in which the balancing means consist of steadily regulable resistances, capacities or inductances. Particularly in this connection, however, the use of a complex compensator is most desirable.

The object of the invention is to design the above-mentioned alternating-current connections with the aid of simple and reliable elements in such a manner as to attain reliable and robust measuring systems, particularly to provide a self-balancing compensator of a foolproof type which, for instance, may be used in workshops.

This object is attained according to the invention in the manner that a wattmetric measuring instrument operating at the same time as reversible motor is employed as zero instrument, the wattmetric measuring instrument being connected to the zero branch of the bridge by an intermediate amplifier. By means of such an instrument the connection may be automatically balanced so that the ideal requirement for a complete balance of the bridge is sufficiently fulfilled without the need of effecting any operations by hand. Owing to the use of an amplifier which itself constitutes a sturdy element, as the broadcasting practice has proved, a wattmetric measuring instrument of a robust type may be employed so that sensitive measuring instruments may be entirely dispensed with. The value to be read off or recorded is indicated by the position of the member, for instance of a slide contact, which serves to balance the bridge. This member may either be provided with a pointer moving over a scale or with a recording stylus.

A further advantage of the invention is that no special wattmetric instruments need be provided but that wattmeters of approved types may be used which are available at low prices. Preferably, induction meters, the reliability and durability of which meet with the most exacting conditions of operation, are employed. By the use of meters as zero instrument and reversible motor all properties of these meters may be taken particular advantage of. Since they are inserted in the output circuit of an amplifier, they are very sensitive and may be, therefore, employed as zero instruments. Furthermore, they can perform work of any magnitude if the setting time is correspondingly chosen. Moreover, they have the advantage that the torque steadily decreases on approaching the zero value so that a hunting may be easily avoided also with short setting times. Finally, the damping which is present in this case may be taken advantage of in particular cases to suppress the hunting.

If a complex alternating-current compensator is employed a separately excited induction meter acting at the same time as phase responsive zero indicator and reversible motor is allotted to each of the two balancing directions corresponding to the real and imaginary components and serves to influence the steadily regulable resistances, capacities or inductances employed as balancing means. Since in the case of a phase adjustment in a convergent sense of the exciting fields of the induction meters representing the two directional vectors a univocal relationship between the direction of rotation of the armature and the direction of balance necessary for the convergent balance the balancing means are always influenced in the sense of the desired adjustment of compensation. The meters may be, consequently, rigidly connected to the compensation system so that control contacts may be entirely dispensed with.

To attain a sufficiently high sensitiveness when measuring, the two meters are connected to the zero branch of the compensation or bridge connection through a tube amplifier preferably common to both meters. The members of the balancing means controlled by the meter armature, for instance the slide contacts, are mechanically coupled with the pointers of indicating instruments or with the recording devices of inkers so that the measured values may be continuously indicated or recorded.

In the accompanying drawings are shown some embodiments of my invention in diagrammatic form.

Fig. 1 shows a diagram of connections of an automatic complex compensator for measuring both components of any alternating potential, Fig. 2 the corresponding vector diagram, and Figs. 3 and 4 show how the invention may be applied to determine the loss angle and the capacity of condensers or the like.

In Fig. 1 M denotes the object to be measured. $U_x$ is the voltage to be measured and $P_h$ a phase advancer. $R_1$ and $R_2$ are two slide wire resistances, $A_1$ and $A_2$ the armatures of two meters. $S'_1$ and $S'_2$ denote the voltage coils and $S''_1$ and $S''_2$ the current coils of the meters. V denotes an amplifier with the input voltage U. R and $R_c$ are fixed ohmic resistances. C is a capacity. T is a transformer and $K_1$ and $K_2$ are contact arms controlled by the meter armatures. The ends of the slide wires $R_1$ and $R_2$ are designated by I and III and II and IV respectively. $B_1$ and $B_2$ are brake magnets. $T_1$ is an insulating transformer.

The system operates as follows: For the compensation of the alternating voltage $U_x$ to be measured two reference voltages $U_{N1}$ and $U_{N2}$ 90° out of phase with respect to each other and tapped from the slide wires $R_1$ and $R_2$ are employed. Since $R_1$ is connected to the non-inductive and non-capacitive ohmic resistance R and $R_2$ is inserted in the secondary circuit of the inductance $T_1$ with a series resistance $R_c$ together with a parallel-connected condenser C, the currents designated by $J_{R1}$ and $J_{R2}$ and flowing in $R_1$ and $R_2$ are 90° out of phase.

Consequently, a reference voltage $$U_N = \sqrt{U_{N1}^2 + U_{N2}^2}$$

regulable as to magnitude and phase may be taken from the four slide wire halves $O_1I$, $O_2II$, $O_1III$ and $O_2IV$ which correspond to the axes of a rectangular coordinate system. Consequently, the voltage vectors in all four quadrants may be compensated for. The position of phase of the above-mentioned coordinate system is determined by the current $J_K$ flowing through the resistance R and the primary winding of the inductance $T_1$.

The meter armatures $A_1$ and $A_2$ coupled with the contact arms $K_1$ and $K_2$ through the worm gears $G_1$ and $G_2$ serve to adjust automatically the reference voltages $U_{N1}$ and $U_{N2}$. The voltage coils $S'_1$ and $S'_2$ of the meters are energized by the phase advancer $P_h$ with sine currents 90° out of phase, whereas the current coils $S''_1$ and $S''_2$ are in series and connected through the tube amplifier V supplied with alternating current to the compensation circuit, preferably grounded, so that they are traversed by an output current proportional to the input voltage U of the amplifier V.

In order to explain more clearly the operation of the system, Fig. 2 shows the vector diagram of the compensation voltages acting in the zero branch and of the magnetic fluxes $\Phi'_1$, $\Phi''_1$, $\Phi'_2$ and $\Phi''_2$ occurring in the two meters, the fluxes belonging to those circuits which are surrounded by the windings S provided with the same index. If the system for carrying out the measurements is not yet balanced the input voltage U is applied to the amplifier V and is formed by the geometric difference of the voltage $$U_x = \sqrt{U_{x1}^2 + U_{x2}^2}$$

to be measured and of the reference voltage $$U_N = \sqrt{U_{N1}^2 + U_{N2}^2}$$

and split up into the components $U_1 = U_{x1} - U_{N1}$ and $U_2 = U_{x2} - U_{N2}$. In the special case shown as example in Fig. 2 the phases of the magnetic fluxes for the two meters are so chosen that $$\sphericalangle(U\Theta''_1) = \sphericalangle(U\Theta''_2) = 180°$$

and $$\sphericalangle(U_1\Theta'_1) = \sphericalangle(U_2\Theta'_2) = 90°$$

If $\varphi_1$ and $\varphi_2$ denote the phase angles between $\Phi'_1$ and $\Phi''_1$ and $\Phi'_2$ and $\Phi''_2$ respectively the torques $D_1$, $D_2$ acting on the discs $A_1$, $A_2$ are obtained by the equations:

$$D_1 = \text{const} \cdot \Phi'_1 \cdot \Phi''_1 \cdot \sin \varphi_1$$

$$D_2 = \text{const} \cdot \Phi'_2 \cdot \Phi''_2 \cdot \sin \varphi_2$$

It follows that $D_1$ corresponds to the real component $U_1$ and $D_2$ to the imaginary component $U_2$ with reference to magnitude and direction. The directions of rotation of the two discs $A_1$, $A_2$ are so chosen that $A_1$ moves the slide contact $K_1$ and $A_2$ the slide contact $K_2$ in the sense of the desired adjustment of compensation ($U_1 = 0$, i. e., $U_{N1} = U_{x1}$ and $U_2 = 0$, i. e., $U_{N2} = U_{x2}$). In this case the corresponding rotary speed of $A_1$ and $A_2$ is proportional to the corresponding magnitude of $U_1$ and $U_2$ respectively; i. e. to the corresponding departure from the state of compensation. The more $K_1$ and $K_2$ approach the adjustment of compensation the slower $A_1$ and $A_2$ rotate; a hunting of the indicating or recording devices coupled with $K_1$ and $K_2$ is, therefore, avoided. The system can be so designed that the setting time of these devices amounts only to about 2 seconds.

The invention may be applied in all such cases in which complex alternating-current quantities are preferably compensated for. Thus, the compensator may be used in bridge connections by compensating the voltage applied to the measuring diagonal of the bridge or the compensating current flowing through the measuring diagonal instead of balancing the bridge. The system according to the invention may be employed, for instance, to measure the non-reactive resistance and reactance of coil systems or the like and is of particular importance for examining condenser-like objects to be measured so as to automatically record the capacity and the loss factor of condensers, cables, high-tension apparatus and the like by recording measuring instruments provided with inkers and having a great speed of adjustment.

Figs. 3 and 4 show two embodiments for the above purpose in diagrammatic form. In both figures $Th$ is a high-tension transformer which supplies the voltage $U_h$ to the bridge. For adjusting a desired bridge supply voltage a regulating transformer may be employed inserted between the supply circuit and the transformer. The transformer $Th$ may, however, be also designed as regulating transformer. $C_x$ is the capacity to be measured and $C_n$ a standard capacity. $R_3$ to $R_5$ denote fixed bridge resistances. $D_1$ and $D_2$ are slide wires, on which the slide contacts $K'_1$ and $K'_2$ are adjustably arranged. The wires $D_1$ and $D_2$ are designed in the form of a circle so that the contacts $K'_1$ and $K'_2$ may be adjusted by a rotary motion which is transmitted to the contacts by two alternating-current induction meters $M_1$ and $M_2$ through worm gears shown schematically. The voltage coils of the two meters are connected to the supply circuit through a phase advancer $Ph'$. In this case the connection of the windings with the phase advancer is so chosen that the voltages of the two coils are 90° out of phase. $V'$ denotes an amplifier. In the output circuit of the amplifier are connected in series the two current coils of the meters $M_1$ and $M_2$.

Besides the above-indicated parts the system according to Fig. 4 comprises further a potential transformer $Tn$, by means of which it is possible in a manner well known in the art to operate one portion of the bridge at a low voltage so that a cheap standard capacity and low ohmic resistances may be employed.

The systems shown in Figs. 3 and 4 operate as follows:

The condensers $C_x$, $C_n$ and the ohmic resistances $R_3$, on the one hand, and $R_4$, $R_5$, on the other hand, constitute the known condenser measuring bridge. The variable ohmic resistance $D_2$ is in series with the standard capacity $C_n$. Its magnitude forms, consequently, when the bridge is balanced a measure for the loss angle of the condenser $C_x$ to be measured, provided that the standard condenser $C_n$ be free of losses. The variable resistance $D_1$ is connected in parallel relation to the bridge resistance $R_4$. It may, therefore, be employed to balance the bridge when measuring the capacity, so that its magnitude constitutes a measure for the departure of the capacity value of the condenser to be measured from the value of the standard capacity. The resistance $R_5$ which is shown in series with the variable resistance $D_1$ has only the purpose to enhance the accuracy of the indication; i. e., if the departures of the capacity values from the predetermined standard value are kept within very narrow limits and are to be determined with great accuracy. By the adjustment of the phase advancer $Ph'$ it is possible to cause the meter $M_1$ to operate in response to the wattless component of the compensating current flowing in the measuring diagonal and the meter $M_2$ to operate in response to the watt component of the compensating current. The proper adjustment may be recognized in a simple manner by the fact that the meter $M_1$ when the bridge is balanced and the phase advancer is in the proper position may not operate in response to a change of the resistance $D_2$ and that the meter $M_2$ may not operate in response to a change of the resistance $D_1$.

From the above considerations it will be apparent that the path of the contact $K'_1$ on the resistance wire $D_1$ may be calibrated in accordance with the values of $\Delta C$, i. e., with the departures of the capacity to be measured from the standard capacity and the path of the contact $K'_2$ on the resistance wire $D_2$ directly in accordance with the values of $tg\delta$, where $\delta$ is the loss angle.

Either a scale may be provided or the movement of the contact may be transmitted directly to a stylus and need not be observed by the attendants.

I claim as my invention:

1. In an arrangement for measuring the loss angle of condensers, an alternating current source, a bridge circuit connected with said source and comprising in different bridge branches the condenser to be measured and a standard condenser, a regulatable resistance for measuring the loss angle series connected in the bridge branch containing said standard condenser and a separately excited induction meter electrically coupled with the zero branch of said bridge and mechanically connected with said resistance in order to serve at the same time as zero instrument and as reversible motor for regulating said resistance to effect balancing of the bridge.

2. In an arrangement for measuring the loss angle of condensers, an alternating current source, a bridge arrangement connected with said source and comprising in two different bridge branches the condenser to be measured and a standard condenser, a regulatable resistance for measuring the loss angle series connected in the bridge branch containing said standard condenser, a separately excited induction meter electrically coupled with the zero branch of said bridge and mechanically connected with said resistance in order to serve at the same time as zero instrument and as reversible motor for regulating said resistance to effect balancing of the bridge, and a regulatable ohmic resistance disposed in one of the other two bridge branches for determining the magnitude of the condenser the loss angle of which is to be measured.

3. In an arrangement for measuring the loss angle of condensers, an alternating current source, a bridge circuit connected with said source and comprising in two different bridge branches the condenser to be measured and a standard condenser, a regulatable resistance for measuring the loss angle series connected in the bridge branch containing said standard condenser, a separately excited wattmetric device electrically coupled with the zero branch of said bridge and mechanically connected with said resistance in order to serve at the same time as zero instrument and as reversible motor for regulating said resistance, another regulatable ohmic resistance disposed in one of the other two bridge branches for determining the magnitude of the condenser the loss angle of which is to be measured, and a second wattmetric device also electrically coupled with said zero branch and mechanically connected with said other resistance so as to effect an automatic balancing.

4. In a system for compensating an alternating voltage, an alternating voltage source synchronous with the voltage to be compensated, two variable balancing means arranged with said source in a circuit producing 90° phase difference between the two adjustable voltages derivable from said balancing means, said means being disposed for balancing by said adjustable voltages the voltage to be compensated, two wattmetric measuring devices each having a voltage coil, a current coil and an armature actuated by the exciting fields produced by said coils, each of said armatures being mechanically connected with one of said variable balancing means to adjust said means independently of the other balancing means, an arrangement for supplying each of said voltage coils with a current independent of that of the other voltage coil, phase displacing means for adjusting a phase difference between the exciting fields of said wattmetric devices, and an amplifier having its input circuit connected in a branch of the system in which by said adjustable voltages a voltage compensation is effected and having its output circuit connected with the current coils of said two wattmetric instruments.

5. In combination with a bridge circuit for measuring alternating current properties, an alternating current source connected with said bridge circuit, two balancing means disposed in different bridge branches of said circuit, two wattmetric measuring devices each having a voltage coil, a current coil and an armature actuated by said coils, an operative connection between each of said armatures and one of said balancing means for adjusting said means independently of each other, an arrangement for supplying two currents independent of each other to the voltage coils of said two wattmetric devices, means for producing a given phase difference between the currents in said two voltage coils, and an amplifier having its input circuit connected with the zero branch of said bridge circuit and its output circuit connected with said current coils.

6. In a system for compensating the real and the imaginary component of an alternating voltage, an arrangement for producing two comparative balance voltages including an alternating voltage source synchronous with the voltage to be compensated, two variable impedances for adjusting said two voltages, a connection between said impedances and said source for producing a phase difference of 90° between said two comparative voltages, two wattmetric induction meters each having a voltage coil, a current coil and an armature actuated by said coils, each of said armatures being connected with one of said impedances for adjusting said impedances independently of each other, a phase displacing arrangement for supplying two voltages of different phase to said voltage coils, and an amplifying device having its input circuit connected in the branch of said system in which a voltage compensation is to be effected by said two comparative voltages, the output circuit of said amplifying device being connected with the current coils of said two induction meters.

7. In a system for measuring alternating current properties by means of a bridge circuit, an alternating current source connected with said bridge circuit, two variable impedances disposed in different bridge branches of said circuit, two wattmetric induction meters each being operatively connected with either of said variable impedances for adjusting said impedances, an arrangement for supplying voltages to the voltage coils of said two meters, a phase displacer forming part of said arrangement for producing a phase difference between two voltages supplied to said voltage coils, an amplifier disposed in the zero branch of said bridge circuit for supplying current to the current coils of said meters.

8. In a system for compensating the real and the imaginary components of an alternating potential, an alternating voltage source synchronous with the voltage to be compensated, a compensating circuit connected with said source, steadily regulatable impedances disposed in said circuit so as to form means for balancing said voltage, an amplifying device having its input circuit connected with the zero branch of said compensating circuit, two separately excited wattmetric instruments each having a voltage coil, a current coil and an armature actuated by said coils, said armatures being operatively connected with said impedances, said current coils being connected with the output circuit of said amplifier, and an arrangement including a phase advancer for supplying voltages of 90° phase difference to the voltage coils of said meters, whereby said wattmeters serve at the same time as zero indicators and as reversible motors for regulating said impedances.

WILHELM GEYGER.